United States Patent
Ausmeier et al.

(10) Patent No.: US 10,464,279 B2
(45) Date of Patent: Nov. 5, 2019

(54) INJECTION MOLDED PART HAVING A BASE PART AND A THERETO FASTENED CUSHIONING SHAPED PART, AND METHOD FOR PRODUCING THE SAME

(71) Applicant: TechnoGel GmbH, Duderstadt (DE)

(72) Inventors: Matthias Ausmeier, Osterode am Harz (DE); Frank Stefan Klingebiel, Duderstadt (DE); Hans Hermann Dreyling, Duderstadt (DE); Jan Klingebiel, Duderstadt (DE); Daniel Ballueer, Teistungen (DE)

(73) Assignee: TECHNOGEL GMBH, Duderstadt (DE)

( * ) Notice: Subject to any disclaimer, the term of this patent is extended or adjusted under 35 U.S.C. 154(b) by 9 days.

(21) Appl. No.: 15/077,261

(22) Filed: Mar. 22, 2016

(65) Prior Publication Data

US 2016/0279845 A1  Sep. 29, 2016

(30) Foreign Application Priority Data

Mar. 27, 2015 (DE) .......................... 10 2015 205 645

(51) Int. Cl.
*B32B 3/06* (2006.01)
*B32B 3/02* (2006.01)
(Continued)

(52) U.S. Cl.
CPC .......... *B32B 3/06* (2013.01); *B29C 45/14336* (2013.01); *B29C 45/14418* (2013.01);
(Continued)

(58) Field of Classification Search
CPC .................. A47C 27/148; A47C 27/15; Y10T 428/24273–428/24347; Y10T 428/19;
(Continued)

(56) References Cited

U.S. PATENT DOCUMENTS 4,726,086 A * 2/1988 McEvoy .................. A47C 7/18
249/166
4,999,068 A * 3/1991 Chiarella ................... B62J 1/18
156/145

(Continued)

FOREIGN PATENT DOCUMENTS

CN 102232015 A 11/2011
CN 203831724 U 9/2014
(Continued)

OTHER PUBLICATIONS

NPL on Fumed silica. Obtained from https://www.sigmaaldrich.com/content/dam/sigma-aldrich/docs/Aldrich/Product_Information_Sheet/s5130pis.pdf on Apr. 13, 2017.*

*Primary Examiner* — Z. Jim Yang
(74) *Attorney, Agent, or Firm* — W&C IP

(57) ABSTRACT

An injection molded part is formed of a base part and a soft component which includes a cushioning shaped part fastened thereto. Injection (molding is performed without additional connection steps by having the cushioning shaped part have a soft, cast gel body completely covered on its boundary surface with a hard component that is a flexible and elastically deformable material which forms a circumferential flange-like rim protruding laterally beyond the cast gel body. During injection molding the hard component is being surrounded by the material of the base part while shielding the cast gel body from the injected material used to form the base part.

6 Claims, 3 Drawing Sheets

(51) Int. Cl.
    *B29C 45/14* (2006.01)
    *B29C 45/16* (2006.01)
    *B29K 675/00* (2006.01)
    *B29L 9/00* (2006.01)

(52) U.S. Cl.
    CPC .. B29C 45/14778 (2013.01); B29C 45/14836 (2013.01); B32B 3/02 (2013.01); *B29C 45/1615* (2013.01); *B29C 2045/14934* (2013.01); *B29K 2675/00* (2013.01); *B29L 2009/00* (2013.01); *Y10T 428/24174* (2015.01); *Y10T 428/24182* (2015.01); *Y10T 428/24777* (2015.01)

(58) Field of Classification Search
    CPC ... Y10T 428/192; Y10T 428/197; B32B 3/02; B32B 3/06; A41D 13/05–13/1192; B29C 70/76; B29C 70/763
    See application file for complete search history.

(56) References Cited

U.S. PATENT DOCUMENTS

| | | | | |
|---|---|---|---|---|
| 5,445,858 A * | 8/1995 | Nwoko | A45F 3/12 | 428/174 |
| 6,129,695 A * | 10/2000 | Peters | A41D 13/05 | 602/61 |
| 6,503,161 B2 * | 1/2003 | Bothwell | A63B 59/00 | 473/540 |
| 6,701,529 B1 * | 3/2004 | Rhoades | C08L 83/14 | 2/2.5 |
| 8,091,963 B2 * | 1/2012 | Wyner | A41D 13/082 | 297/214 |
| 9,216,678 B1 * | 12/2015 | Mobley | B60N 3/06 | |
| 2001/0047047 A1 * | 11/2001 | Nowak | C08G 18/4816 | 524/430 |
| 2003/0169236 A1 | 9/2003 | Crocker | | |
| 2005/0210809 A1 * | 9/2005 | Nevison | E04F 15/105 | 52/578 |
| 2006/0019057 A1 * | 1/2006 | Mason | B60N 3/044 | 428/88 |
| 2007/0143942 A1 * | 6/2007 | Fox | A46B 5/02 | 15/143.1 |
| 2007/0261274 A1 * | 11/2007 | Fox | A43B 1/0072 | 36/154 |
| 2008/0113170 A1 * | 5/2008 | McMahan | A47G 27/0231 | 428/217 |
| 2008/0193699 A1 * | 8/2008 | Terreni | B29C 44/1257 | 428/45 |
| 2008/0230661 A1 * | 9/2008 | Kawabata | B29C 45/0001 | 248/205.5 |
| 2009/0191989 A1 * | 7/2009 | Lammer | A41D 13/015 | 473/535 |
| 2009/0287283 A1 | 11/2009 | Biser et al. | | |
| 2010/0237082 A1 * | 9/2010 | Fernandez | A47C 7/021 | 220/592.17 |
| 2011/0259572 A1 | 10/2011 | Muratani et al. | | |
| 2012/0167308 A1 * | 7/2012 | Van Lear | A47C 27/085 | 5/655.5 |
| 2012/0168339 A1 * | 7/2012 | Jan | B29C 45/0055 | 206/524.1 |
| 2012/0244312 A1 * | 9/2012 | Pearce | D06N 3/106 | 428/136 |
| 2013/0084413 A1 * | 4/2013 | McMahan | B32B 5/18 | 428/33 |
| 2013/0093125 A1 * | 4/2013 | Furey | B29C 45/14065 | 264/503 |
| 2013/0105354 A1 * | 5/2013 | Wyner | B65D 81/1275 | 206/586 |
| 2013/0171419 A1 * | 7/2013 | Tyler | B60N 3/044 | 428/167 |
| 2014/0037897 A1 * | 2/2014 | Wyner | A45C 3/001 | 428/138 |
| 2014/0096324 A1 * | 4/2014 | LaFlamme | A47C 27/15 | 5/691 |
| 2014/0302271 A1 * | 10/2014 | Losio | B32B 3/263 | 428/76 |
| 2015/0082523 A1 * | 3/2015 | Wyner | B32B 3/04 | 2/455 |

FOREIGN PATENT DOCUMENTS

| | | | |
|---|---|---|---|
| DE | 37 12 882 A1 | 11/1988 | |
| DE | 3712882 A1 | 11/1988 | |
| DE | 102006013857 A1 | 9/2007 | |
| EP | 0 552 040 A1 | 7/1993 | |
| EP | 1 125 975 B1 | 9/2004 | |
| GB | 1541071 A * | 2/1979 | ............ A47C 27/00 |
| WO | 2014/055596 A1 | 4/2014 | |

* cited by examiner

INJECTION MOLDED PART HAVING A BASE PART AND A THERETO FASTENED CUSHIONING SHAPED PART, AND METHOD FOR PRODUCING THE SAME

FIELD OF THE INVENTION

The invention relates to an injection molded part, formed of a base part, produced in an injection molding process, and a thereto fastened cushioning shaped part.

BACKGROUND

The material selection for injection molded parts is based on numerous aspects, including, in particular, the desired stability, strength, elasticity and flexibility of the injection molded part which is to be produced. Materials selected on the basis of the respective aspects cannot however meet all requirements, particularly if the injection molded part is intended to bear against a body. Due to relative movements, the material of the injection molded part can then lead to chafe marks and similar damage. Particularly when there is bearing contact against a living human or animal body, nasty pressure points, grazes, or even incisions can hereupon be caused. It is therefore known to provide the injection molded part with a cushioning shaped part consisting of a softer material. For this, a shaped part made of a gel is in particular suitable. Since the soft shaped part cannot regularly withstand the injection molding pressures in a dimensionally stable manner, it is usually produced separately and subsequently applied, for instance glued, to the injection molded part produced in an injection molding process. This method is laborious and ensures a higher price for the injection molded part.

SUMMARY

The object of the present invention is to enable an injection molded part of said type, in which a separate effort for the connection of base part and cushioning shaped part is not required.

This object is successfully achieved with an injection molded part of the type mentioned in the introduction, by virtue of the fact that the cushioning shaped part is formed with a soft, cast gel body (soft component), which is completely covered on a boundary surface with a harder, yet flexible and elastically deformable material (hard component), which forms a circumferential flange-like rim protruding laterally beyond the gel body, wherein the cushioning shaped part is connected through the hard component to the base part.

The injection molded part according to the invention thus has a cushioning shaped part, which is of two-part configuration. The actual cushioning effect is produced by a soft component, which is formed by a soft, cast gel body. In the direction of the base part, this soft component is completely covered by a hard component of the cushioning shaped part. The hard component has a greater hardness than the soft component, yet is likewise flexible and elastically deformable. The hard component is preferably formed of a hard gel, which is similar in its structure to the gel of the soft component, so that the soft component and the hard component in the liquid state bond together well in an integral manner without the need for an adhesive. The hard component projects laterally beyond the gel body with a circumferential flange-like rim, with which, in the injection mold, the required demarcation of the soft, cast gel body from the injected material of the base part is realized. The circumferential flange-like rim enables a complete sealing of the space filled by the cast gel body, which space is formed by a negative form in the injection molding tool. As a result of the applied hard component of the cushioning shaped part, this latter is capable of withstanding in a dimensionally stable manner the subsequent injection pressure for the base part. The material of the hard component is hereupon strongly compressed in the region of the sealing circumferential rim, for instance to a thickness of 30% of the initial thickness of the material. If therefore, in a preferred illustrative embodiment, the material thickness of the circumferential flange-like rim sealed is 1 mm, this rim is clamped between two shaped parts and compressed to, for instance, 0.3 mm by the closing pressure of the injection mold. The material of the hard component must be selected such that it can withstand this elastic deformation and the injection pressure. It can be expedient if the hard component consists of a filled hard gel, in particular a hard gel filled with a metal oxide or a metalloid oxide, such as silicic acid, for example, consists of a filled polyurethane gel, as is known through EP 1 125 975 B1. In a preferred illustrative embodiment, the hard gel has a hardness of 40 Shore A.

Preferred material combinations for the soft component and the hard component are polyurethane (PU) soft gel with PU hard gel, and silicone soft gel with silicone hard gel. However, other combinations, for instance a PU foam as the soft component with a PU hard gel as the hard component, are also possible.

In particular where a soft gel of PU, which is inclined to stickiness, is used, it is advantageous if the soft component is completely enclosed by a cover film outside the boundary surface covered by the hard component. The cover film is expediently a high-performance thermoplastic polyurethane (TPU) film, as are marketed, for instance, under the brand names "Platilon" or "Dureflex".

When the material of the hard component is applied, the film bonds together with hard component, so that it additionally fulfills the function of holding the soft component, even under load, in a limited volume, so that the soft component reverts after loading to the initial shape. For this, it is expedient to pre-deform the cover film, for instance by deep drawing.

Since also the hard gel of the hard component can still be sticky, it is expedient if that surface of the hard component which is facing away from the soft component is likewise covered with a film. This film must be compatible with the injection molding material. In particular, the cover film of the hard component can likewise be a TPU film, which can differ from the TPU film of the soft component. As the injection molding material for the base part, a TPU can likewise be used. However, other materials, such as silicone, polycarbonate, etc., are also possible.

The production of the injection molded part according to the invention with the cast cushioning shaped part is realized by the soft component of the cushioning shaped part firstly being cast in a suitable mold, after which the hard component is applied. The shaped part is introduced with its soft component into a corresponding negative form forming a first mold piece of an injection mold, so that, when the injection mold is closed by a second mold piece and clamps the circumferential rim with the closing pressure of the injection mold, the circumferential rim of the hard component rests sealingly on a surface which closes off the negative form. The injection molding operation is then performed for the base part, wherein the soft component in the negative form is shielded by the hard component against the injected material of the base part and the hard component is surrounded by the material of the base part.

In the injection molded part according to the invention, the connection between the base part and the cushioning shaped part thus takes place at the hard component, while the soft component remains shielded from the material of the base part by the sealing by means of the hard component. For some applications, it can be advantageous if the connection between the hard component and the material of the base part is realized solely in the region of the narrow free edge of the hard component of the cushioning shaped part, i.e. if that face of the hard component which is facing away from the soft component remains free.

For the application of the film which covers the soft component, this film is firstly shaped into the casting mold for the soft component, for instance by deep drawing, so that the casting of the soft component into the casting mold lined with the film is realized. Next the hard component is applied, preferably likewise by a casting operation and preferably still while the soft component is still in its casting mold. The crosslinking of the two components can be realized in the case of polyurethane, for instance, reactively. After this, the cushioning shaped part is inserted into the negative form of the injection mold and the injection molding operation is performed for the base part.

In a refinement of the method according to the invention, prior to the performance of the injection molding operation that face of the hard component which is facing away from the soft component is also covered with a cover film. This is in particular expedient if the connection between the cushioning shaped part and the base part is realized, for instance, solely in the region of the narrow free edge of the hard component of the cushioning shaped part, such that that face of the hard component which is facing away from the soft component is not covered by the material of the base part and therefore remains free. The film then avoids a possibly nasty sticky surface of the injection molded part in the region of the hard component of the cushioning shaped part. The application of the film is preferably realized prior to the insertion into the injection mold, in particular still in the casting mold for the soft component after the application, preferably casting-on, of the hard component.

DESCRIPTION OF THE DRAWINGS

The invention is explained in greater detail below on the basis of the illustrative embodiments represented in the drawing, in which.

DETAILED DESCRIPTION

Figure 1:
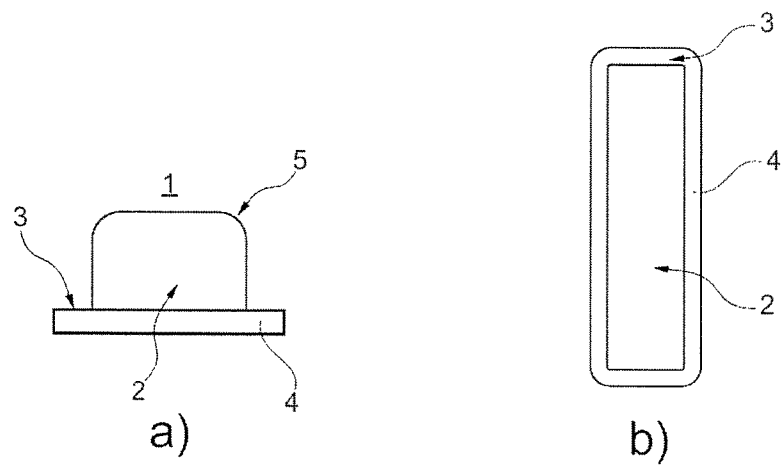
FIG. 1 shows a side view and a top view of a cushioning shaped part consisting of a soft component and a hard component.

That illustrative embodiment of a cushioning shaped part 1 which is represented in FIG. 1a comprises or consists of a soft component 2, which can be formed of a polyurethane soft gel, and a hard component 3, which completely covers at least one side—here a bottom side—of the soft component and protrudes beyond the contour of the soft component with a circumferential, flange-like rim 4. In the represented illustrative embodiment, the soft component 2 is covered, on all sides which are not covered by the hard component 3, with a pre-deformed film 5. On the circumferential flange-like rim 4 of the hard component 3, the film 5 is preferably connected to this rim, so that the film 5 encloses with the hard component 3 a space filled by the soft component 2.

The top view in FIG. 1b) illustrates that the soft component 2 and the hard component 3 can have an elongated shape. All possible shapes for the soft component 2 and the hard component 3 are possible as long as the hard component 3 can surround the soft component 2 with a circumferential flange-like rim 4, the function of which is described in greater detail below.

Figure 2:
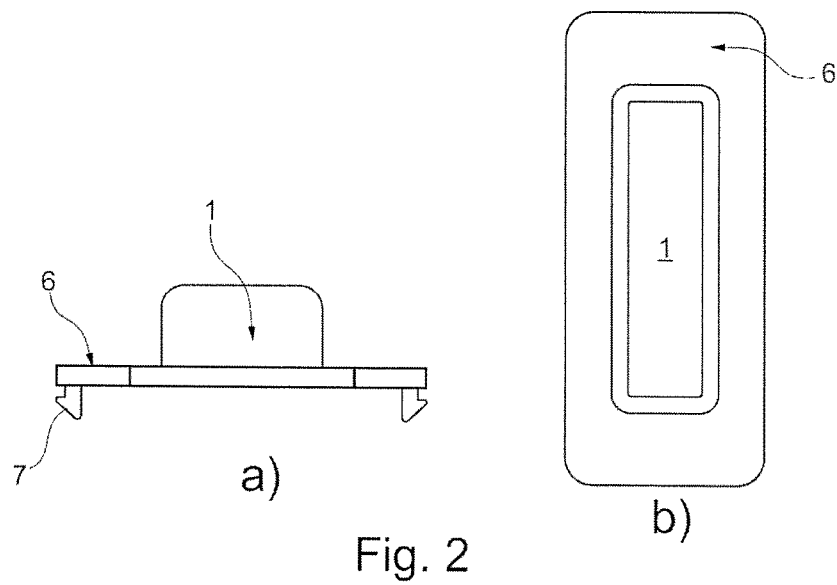
FIG. 2 shows a side view and a top view of a finished injection molded part, in which the cushioning shaped part is connected to the material of a base part.

FIGS. 2a and 2b shows a side view and a top view of an injection molded part comprising or consisting of the cushioning shaped part 1 and a base part 6. The base part 6 is here represented, merely as an illustrative embodiment, in substantially rectangular, elongated form, but can have any chosen configuration. In particular, the base part 6 does not necessarily have to be of planar configuration. It can also have complicated shapes, such as, for instance, a spectacles shape for an eye mask. The base part 6 can further be of frame-shaped configuration, wherein the cushioning shaped part 1 can provide padding for an inner border and/or outer border of the frame part. In the illustrative embodiment represented in FIG. 2, the base part has injection molded latching hooks 7, with which the base part 6 and the cushioning shaped part 1 connected thereto can be snap-locked into a receiving fixture.

The base part 6 is produced in an injection molding process, wherein the cushioning shaped part 1, in the course of the injection molding operation, is connected to the base part 6.

Figure 3:
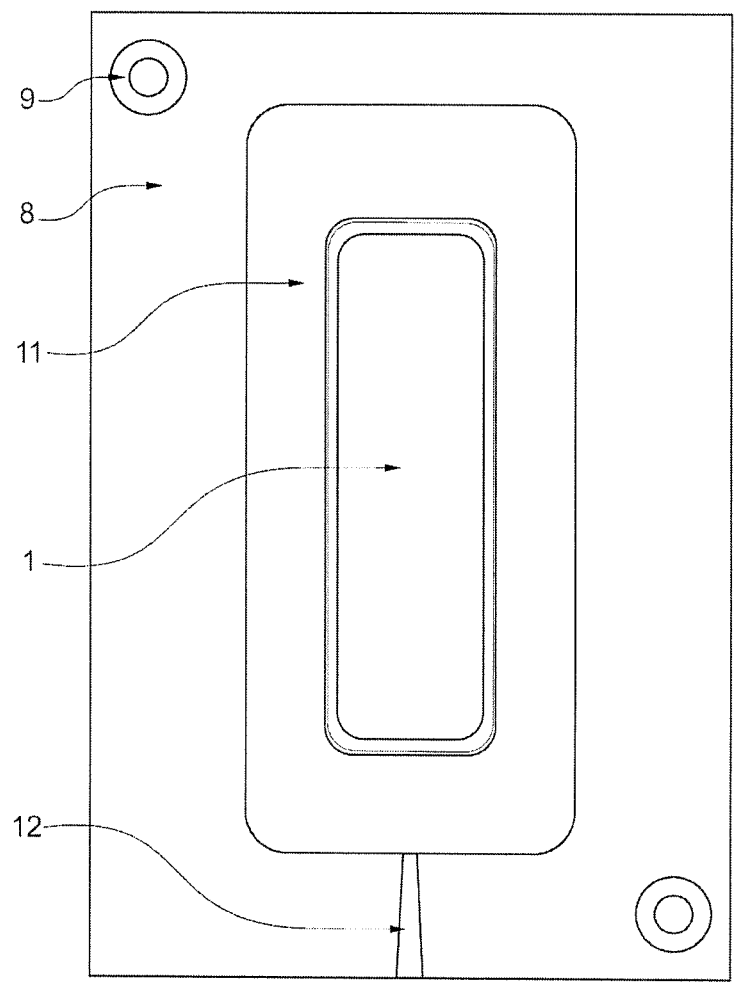
FIG. 3 shows a top view of a first mold piece (bottom part) of an injection mold.
Figure 4:
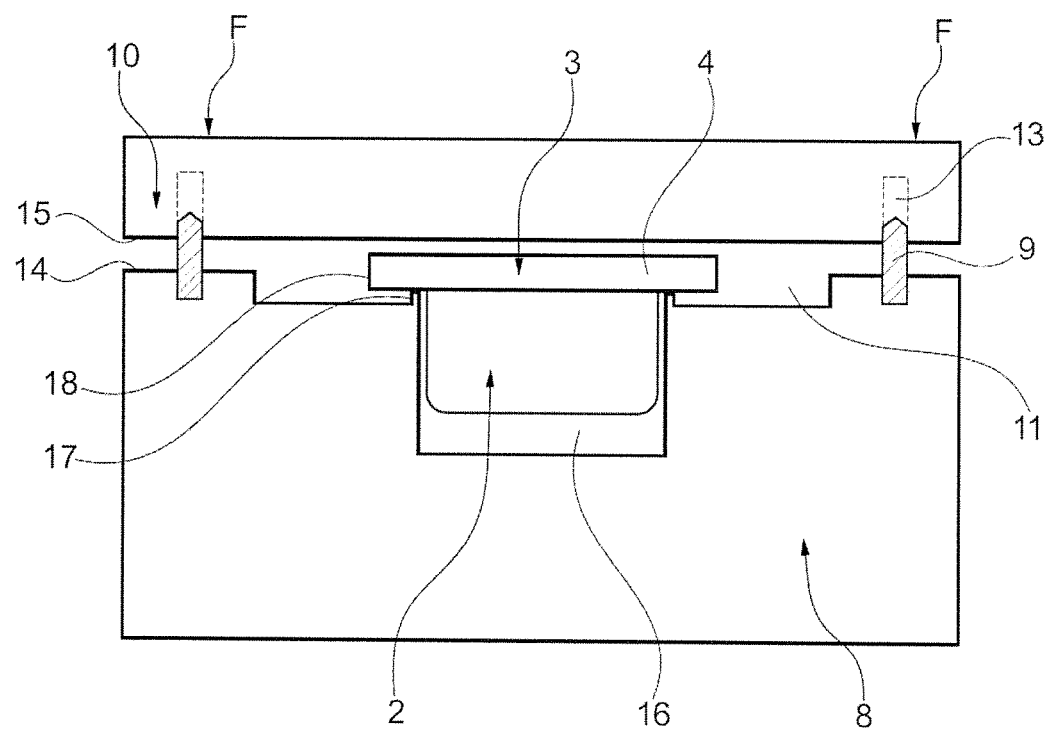
FIG. 4 shows a section through the injection mold consisting of a first mold piece and second mold piece (not yet closed) with an inserted cushioning shaped part, the hard component of which latter is surrounded by the material of the base part.

FIG. 3 shows a top view of a first mold piece 8 of an injection molding tool. The first mold piece 8 forms a rectangular mold bottom part, which at two diagonally opposing corners is provided with guide pins 9 for the exact positioning relative to a second mold piece 10 (mold top part: FIG. 4). Into the first mold piece 8, represented in FIG. 3, is shaped an injection molding cavity 11, with which the base part 6 is shaped. In the center of the injection molding cavity 11 is found the inserted cushioning shaped part 1, which has preferably been preproduced as a cast shaped part.

FIG. 3 further reveals a sprue channel 12, via which the injection molding cavity 11, in the course of the injection molding operation, is filled with the material of the base part 6.

FIG. 4 illustrates the interplay of the first mold piece 8 with the second mold piece 10 for the injection molding operation. The guide pins 9 of the first mold piece 8 are guided in corresponding guide holes 13 of the second mold piece 10, so that the mold can be closed by downward pressing of the second mold piece 10 against the first mold piece 8 until flat opposite faces 14, 15 of the two mold pieces 8, 10 are pressed one onto the other. FIG. 4 reveals that the injection molding cavity 11 thereby forms a closed space, into which the material of the base part 6 is injected. It here also becomes clear that the pressing of the second mold piece 10 onto the first mold piece 8, up to the complete closure of the injection mold, requires the hard component 3 to be elastically compressed. The soft component 2 here projects into a corresponding negative form 16 of the first mold piece 8, which on the top side, in the direction of the circumferential flange-like rim 4, is closed off with an annular projection 17, onto which the flange-like rim 4 of the main component 3 is pressed, so that the negative form, with the therein located soft component, is securely sealed in the course of the injection molding operation. The soft component 2 is therefore completely shielded by the hard component 3 from the material pressure of the material of the base part 6 in the course of the injection molding operation.

The arrows F illustrate that closing pressure of the injection molding tool with which the second mold piece 10 is forced out of the, in FIG. 4, not yet closed position toward the first mold piece 8 until the flat faces 14, 15 lie with pressure one upon the other, so that the tool is closed.

The inventive configuration of the cushioning shaped part 1 comprising or consisting of the soft component 2 and the hard component 3 thus enables the cushioning shaped part 1 to be embedded in the material of the base part 6 in an injection molding operation, without the injection pressure rendering the soft component 2 unusable. The hard component 3 shields the soft component 2 from the injection pressure and serves with its circumferential flange-like rim 4 to seal that negative form 16 of the injection molding tool in which the soft component 2 is accommodated.

In one embodiment of the injection molding tool according to FIG. 4, the flat face 15 of the second mold piece 10 bears squarely against the planar hard component 3, so that this is connected to the material of the base part 6 substantially in the region of a circumferential narrow edge 18. Furthermore, the injection molding cavity 11 having the annular projection 17 can be configured such that the flange-like rim 4 is partially also on its top side (which points downward in FIG. 4) annularly surrounded by molding, so that the circumferential flange-like rim 4, on two faces standing perpendicular to each other, is immersed into the material of the base part 6.

Of course, it is further possible to provide the face 15 of the second mold piece 10 with recesses in order to allow material of the base part 6 to enter also on a third side of the hard component 3, so that the hard component 3 can also be surrounded on three sides. In this context, it is merely important that the closing pressure F of the tool presses the flange-like rim 4 of the hard component 3 sealingly against the first mold piece 8 in order to ensure the sealing of the negative form 16, with the therein located soft component 2, during the injection molding operation.

The invention claimed is:

1. Injection molded part, comprising:
a base part produced from a base part material in an injection molding process, and
a cushioning shaped part fastened to the base part,
wherein
the cushioning shaped part is formed with a soft, cast gel body and a hard component,
the soft, cast gel body comprises a boundary surface via which the soft, cast gel body is joined to the hard component,
the hard component completely covers the boundary surface,
the hard component is relatively harder than the soft, cast gel body, and is a flexible and elastically deformable material and is configured to withstand injection molding pressure applied during the injection molding process,
the hard component forms a circumferential rim having a circumferential edge protruding laterally beyond an outer periphery of the boundary surface, and
wherein a connection between the cushioning shaped part and the base part is exclusively between the base part and the hard component and is established due to the base part surrounding the circumferential edge of the rim of the hard component,
wherein the hard component has a surface opposite the boundary surface, wherein the surface is bounded by the circumferential rim, and wherein no portion of the surface overlies the base part.

2. Injection molded part according to claim 1, wherein the cast gel body is completely enclosed by a cover film outside the boundary surface covered by the hard component.

3. Injection molded part according to claim 1, wherein the hard component is of planar configuration, with a constant material thickness.

4. Injection molded part according to claim 1, wherein the hard component is a polyurethane gel filled with fumed silica.

5. Injection molded part according to claim 1 wherein a face of the hard component which faces away from the cast gel body is covered with a film.

6. Injection molded part according to claim 1, wherein the hard component has a hardness of at least 40 Shore A.

* * * * *